(12) United States Patent
Lemmouchi et al.

(10) Patent No.: US 8,851,084 B2
(45) Date of Patent: Oct. 7, 2014

(54) CELLULOSE ACETATE COMPOSITIONS

(75) Inventors: Yahia Lemmouchi, London (GB); Robert Quintana, Mons (BE); Olivier Persenaire, Mons (BE); Leila Bonnaud, Mons (BE); Philippe Dubois, Mons (BE)

(73) Assignee: British American Tobacco (Investments) Limited, London (GB)

( * ) Notice: Subject to any disclaimer, the term of this patent is extended or adjusted under 35 U.S.C. 154(b) by 0 days.

(21) Appl. No.: 14/233,701

(22) PCT Filed: Jul. 18, 2012

(86) PCT No.: PCT/GB2012/051704
§ 371 (c)(1),
(2), (4) Date: Feb. 7, 2014

(87) PCT Pub. No.: WO2013/011301
PCT Pub. Date: Jan. 24, 2013

(65) Prior Publication Data
US 2014/0182613 A1    Jul. 3, 2014

(30) Foreign Application Priority Data

Jul. 19, 2011 (GB) .................................. 1112402.1

(51) Int. Cl.
*A24D 3/04* (2006.01)
*A24D 3/08* (2006.01)
*A24D 3/10* (2006.01)
*C08L 1/12* (2006.01)
*C08L 1/20* (2006.01)
*C08L 1/26* (2006.01)
*A24D 3/06* (2006.01)

(52) U.S. Cl.
CPC . *A24D 3/10* (2013.01); *A24D 3/063* (2013.01)
USPC ........... 131/332; 131/220; 131/331; 131/345; 523/100; 525/54.21; 525/56; 525/78; 525/79; 525/221; 525/450

(58) Field of Classification Search
USPC .......... 131/200–202, 331, 332, 345; 523/100, 523/138; 525/50, 54.2, 54.21, 55, 56, 61, 525/63, 78, 79, 185, 221, 231, 418, 450
See application file for complete search history.

(56) References Cited

U.S. PATENT DOCUMENTS 2,881,771 A    4/1959  Touey
2,941,907 A *  6/1960  Tousignant et al. ........... 131/332

(Continued)

FOREIGN PATENT DOCUMENTS

CA    2653637 A1    11/2007
CN    1834134 A     9/2006

(Continued)

OTHER PUBLICATIONS

Vatsal P. Ghiya et al. "Biodegradability of Cellulose Acetate Plasticized with Citrate Esters" Journal of Macromolecular Science, Part A (1996) 33(5): 627-638.

(Continued)

*Primary Examiner* — Dennis Cordray
(74) *Attorney, Agent, or Firm* — NW Poulsen; LA Pinol

(57) ABSTRACT

The present invention relates to compositions comprising a blend of cellulose acetate and a water soluble polymer. In some embodiments, the composition is water dispersive and/or biodegradable. Embodiments of the invention also relate to processes for preparing such compositions, and to materials and products including such compositions.

20 Claims, 1 Drawing Sheet

(56) References Cited

U.S. PATENT DOCUMENTS

| | | | |
|---|---|---|---|
| 3,318,317 A * | 5/1967 | Sproull et al. | 131/342 |
| 4,826,493 A | 5/1989 | Martini et al. | |
| 5,200,247 A | 4/1993 | Wu et al. | |
| 5,216,050 A | 6/1993 | Sinclair | |
| 5,242,910 A | 9/1993 | Damanj | |
| 5,252,642 A | 10/1993 | Sinclair et al. | |
| 5,360,892 A | 11/1994 | Bonsignore et al. | |
| 5,410,016 A | 4/1995 | Hubbell et al. | |
| 5,434,241 A | 7/1995 | Kim et al. | |
| 5,523,095 A | 6/1996 | Wilson et al. | |
| 5,654,381 A | 8/1997 | Hrkach et al. | |
| 5,714,573 A * | 2/1998 | Randall et al. | 528/354 |
| 5,817,728 A | 10/1998 | Higuchi et al. | |
| 5,883,199 A | 3/1999 | McCarthy et al. | |
| 5,914,381 A | 6/1999 | Terado et al. | |
| 5,945,480 A | 8/1999 | Wang et al. | |
| 5,952,433 A | 9/1999 | Wang et al. | |
| 5,970,988 A * | 10/1999 | Buchanan et al. | 131/332 |
| 5,976,694 A * | 11/1999 | Tsai et al. | 428/373 |
| 6,062,228 A | 5/2000 | Loercks et al. | |
| 6,075,118 A | 6/2000 | Wang et al. | |
| 6,201,068 B1 | 3/2001 | Tsai et al. | |
| 6,475,418 B1 | 11/2002 | Tsai et al. | |
| 6,506,824 B1 * | 1/2003 | Bastioli et al. | 524/47 |
| 6,571,802 B1 * | 6/2003 | Yamashita | 131/332 |
| 6,924,029 B1 | 8/2005 | Caenen et al. | |
| 7,037,959 B1 | 5/2006 | Willett et al. | |
| 7,253,221 B2 * | 8/2007 | Mohanty et al. | 524/31 |
| 2002/0128384 A1 | 9/2002 | Wang et al. | |
| 2003/0118850 A1 | 6/2003 | McCormack et al. | |
| 2010/0203130 A1 | 8/2010 | Tygesen et al. | |
| 2010/0272938 A1 | 10/2010 | Mitchell et al. | |
| 2011/0036366 A1 | 2/2011 | Sebastian | |
| 2012/0000479 A1 * | 1/2012 | Sebastian et al. | 131/332 |

FOREIGN PATENT DOCUMENTS

| | | |
|---|---|---|
| CN | 101400363 A | 7/2007 |
| CN | 101781467 A | 7/2010 |
| DE | 69309701 T3 | 3/2005 |
| EP | 0654504 A2 | 5/1995 |
| EP | 0704470 A2 | 4/1996 |
| EP | 0732341 A2 | 9/1996 |
| EP | 0697427 B1 | 11/1999 |
| EP | 0732341 B1 | 10/2000 |
| EP | 1167589 A1 | 1/2002 |
| EP | 1609819 A1 | 12/2005 |
| EP | 1567025 B1 | 4/2006 |
| GB | 2489491 A | 10/2012 |
| JP | 1156995 A | 3/1999 |
| JP | 4565944 B2 | 3/2006 |
| JP | 4613575 B2 | 4/2006 |
| JP | 4661345 B2 | 11/2006 |
| JP | 2010-255173 A | 11/2010 |
| JP | 2011-32629 A | 2/2011 |
| KR | 912698 B1 | 8/2009 |
| WO | 9204413 A1 | 3/1992 |
| WO | 9400163 A1 | 1/1994 |
| WO | 9504108 A1 | 2/1995 |
| WO | 9621057 A1 | 7/1996 |
| WO | 9829506 A1 | 7/1998 |
| WO | 9906456 A1 | 2/1999 |
| WO | 9923163 A1 | 5/1999 |
| WO | 0168157 A1 | 9/2001 |
| WO | 0216468 A1 | 2/2002 |
| WO | 0228444 A2 | 4/2002 |
| WO | 02053641 A1 | 7/2002 |
| WO | 02074352 A1 | 9/2002 |
| WO | 02085969 A2 | 10/2002 |
| WO | 02085970 A2 | 10/2002 |
| WO | 03105661 A2 | 12/2003 |
| WO | 2006121599 A1 | 11/2006 |
| WO | 2007084460 A2 | 7/2007 |
| WO | 2007135037 A1 | 11/2007 |
| WO | 2008132488 A1 | 11/2008 |
| WO | 2009139508 A1 | 11/2009 |
| WO | 2010098933 A1 | 9/2010 |
| WO | 2011019646 A1 | 2/2011 |

OTHER PUBLICATIONS

International Search Report and Written Opinion, mailed Oct. 24, 2012 for PCT/GB2012/051704, filed Jul. 18, 2012.

Written Opinion of the International Preliminary Examining Authority, mailed Jul. 24, 2013 for PCT/GB2012/051704, filed Jul. 18, 2012.

International Preliminary Report on Patentability, mailed Nov. 8, 2013 for PCT/GB2012/051704, filed Jul. 18, 2012.

D.S. Rosa et al. "The effect of the Mw of PEG in PCL/CA blends", Polymer Testing, vol. 24, 2005, pp. 542-548, XP0027767404.

* cited by examiner

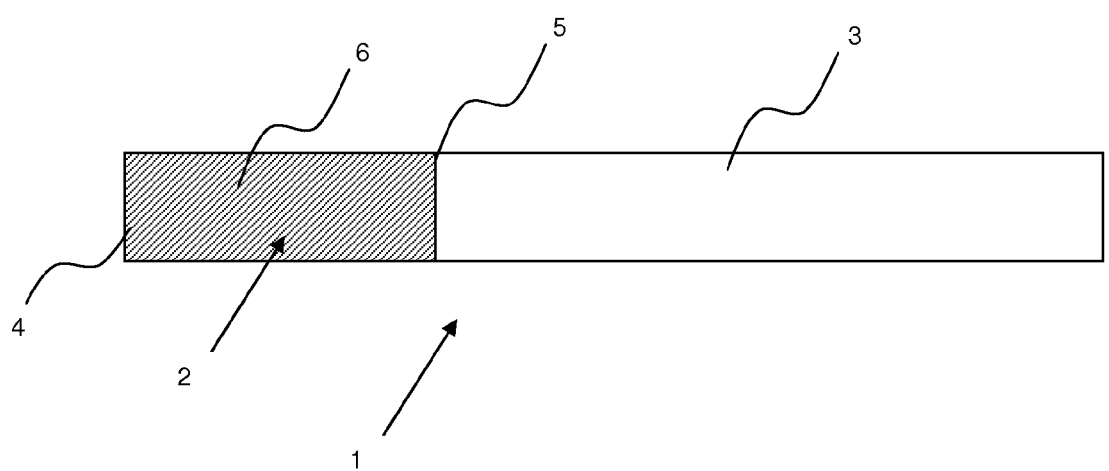

CELLULOSE ACETATE COMPOSITIONS

This application is a National Stage Entry entitled to and hereby claiming priority under 35 U.S.C. §§365 and 371 to corresponding PCT Application No. PCT/GB2012/051704, filed Jul. 18, 2012, which in turn claims priority to GB Application No. 1112402.1, filed Jul. 19, 2011. The entire contents of the aforementioned applications are herein expressly incorporated by reference.

TECHNICAL FIELD

The present invention relates to compositions comprising a blend of cellulose acetate and a water soluble polymer. In some embodiments, the composition is water dispersive and/or biodegradable. Embodiments of the invention also relate to processes for preparing such compositions, and to materials and products including such compositions.

BACKGROUND

For disposable products it is desirable to use materials which are degradable.

Biodegradable polymers disposed of in bioactive environments degrade by the enzymatic action of microorganisms such as bacteria, fungi and algae. Their polymer chains may also be cleaved by non-enzymatic processes such as chemical hydrolysis.

BRIEF DESCRIPTION OF THE FIGURE

For the purposes of example only, embodiments of the invention are described below with reference to the accompanying drawing, in which FIG. 1 is an illustration of a cross-sectional view of a smoking article according to some embodiments of the invention.

DETAILED DESCRIPTION

According to a first aspect of some embodiments of the present invention, there is provided a composition comprising a blend of cellulose acetate and a water soluble polymer. In some embodiments, the cellulose acetate is plasticized cellulose acetate comprising a blend of cellulose acetate and a plasticizer.

According to a second aspect, a method is provided for manufacturing a composition according to the first aspect. In some implementations, the method comprises forming a blend of cellulose acetate and a water soluble polymer, and optionally spinning, moulding or casting the blend. In some embodiments, plasticized cellulose acetate is used to form the blend with a water soluble polymer.

According to a third aspect, a fibre or fibrous material is provided, comprising a composition according to the first aspect, and/or a composition manufactured by the method according to the second aspect.

According to a fourth aspect, a filter element for a smoking article is provided, comprising a composition according to the first aspect, and/or a composition manufactured by the method according to the second aspect, and/or a fibrous material according to the third aspect.

According to a fifth aspect, a smoking article is provided, comprising a composition according to the first aspect, and/or a composition manufactured by the method according to the second aspect, and/or a fibrous material according to the third aspect, and/or a filter element according to the fourth aspect.

In order that aspects of the invention may be more fully understood, an embodiment thereof will now be described by way of illustrative example with reference to the accompanying drawing, FIG. 1, which is a schematic side view of a smoking article including a filter according to embodiments of the invention.

As used herein, the term "smoking article" includes smokeable products such as cigarettes, cigars and cigarillos whether based on tobacco, tobacco derivatives, expanded tobacco, reconstituted tobacco or tobacco substitutes and also alternative tobacco products such as heat-not-burn products.

As used herein, the term "biodegradable" means that the composition degrades within one year using the standard test method for determining aerobic biodegradation of plastic materials under controlled composting conditions.

As used herein, the term "water dispersible" means that the composition dissolves or breaks into pieces smaller than 0.841 mm (20 mesh) after being immersed in water for approximately 24 hours at room temperature.

Cellulose acetate (CA) is an important organic ester which is widely used for many industrial applications in the form of films and fibres. CA is derived from cellulose using the acetylation process and its main properties are its hardness, good resistance to impact, high shine, transparency, pleasing texture, lack of static electricity and resistance to hydrocarbons. CA has been reported to be potentially biodegradable. The biodegradation rate of CA may depend on its degree of acetyl-group substitution (DS). As the DS of CA decreases, the biodegradation rate increases. CA with a DS of less than 2.1 is considered to be biodegradable, whilst CA with a DS above 2.1 may be only poorly or slowly biodegradable.

The biodegradation of CA may involve a first step in which the acetyl group of cellulose acetate is cleaved (for example, by an enzyme released from microorganisms). As the acetyl groups are removed, the DS of the CA is reduced. Then, the CA with decreased DS is subjected to enzyme decomposition by, for example, cellulase, which is widely present in the environment. The rate-limiting step of the biodegradation rate may be the removal of the acetyl group at the start of the process. It may also be that the biodegradation rate is further dependent on the surface area (and therefore the direct exposure of the CA to the environment).

One important use of CA is in the filters of smoking articles such as cigarettes, where it may contribute to the selective removal of semi-volatile compounds. One disadvantage associated with the conventional CA filter material is, however, that it is often slow to degrade. Whilst most of the components of a spent smoking article dissociate into their individual constituent parts and degrade within a relatively short period of time when exposed to moisture and/or mechanical abrasion, CA filter material can be slow to degrade.

The CA generally used in filter materials for inclusion in smoking articles has a DS of around 2.5. This relatively high DS means that CA can be poorly degradable. However, this DS is selected as it renders the CA soluble in solvents such as acetone. Solvent solubility of the CA can be important and may, for instance, allow the material to be processed in useful ways, such as solvent film casting and solvent fibre spinning, which is the process used to form the fibres of the cellulose acetate tow conventionally used in the filters of smoking articles.

CA may be treated for use in smoking article filters with plasticizers. This treatment may involve applying the plasticizer (usually in liquid form) to the surface of the CA fibres, for example by spraying the liquid plasticizer on to the CA tow. The plasticizer acts by binding adjacent fibres to one another at their contact points, thereby affording the filter rods sufficient hardness for cigarette manufacture and use. Thus, although the materials added to CA in this way are generally referred to as plasticizers, they are really acting as binders or hardeners rather than as plasticizers. Suitable plasticizers for this use include triacetin (glycerin triacetate), TEC (triethyl citrate) and PEG 400 (low molecular weight polyethylene glycol). Plasticized cellulose acetate tow is also known to improve the selective removal of semi-volatile compounds found in smoke (e.g. phenol, o-cresol, p-cresol and m-cresol). For this effect, it is considered to be necessary for the plasticizer to be present on the surface of the CA fibres. However, the addition of a plasticizer which binds fibres can result in a reduction in the degradability of the CA filter material. The binding of the fibres certainly slows the separation of the individual fibres making up the tow in a spent smoking article, thus maintaining the bundle of fibres and reducing their exposure to the elements that will carry out any degradation process.

Because of the fibre-binding effect of plasticizers, CA filters generally include less than 10% plasticizer and frequently less than 7%. Including plasticizer in greater amounts than this may have a detrimental effect on the cellulose acetate tow, causing holes to be formed.

CA compositions may be formed from a blend of CA and plasticizer. CA has previously been melt blended with two different citric acid esters: triethyl citrate and acetyl triethyl citrate (see Ghiya et al. "Biodegradability of Cellulose Acetate Plasticized with Citrate Esters" Journal of Macromolecular Science, Part A (1996) 33(5):627-638). The authors observed that both plasticizers are miscible with CA and the addition of plasticizer reduces the tensile modulus and increases the elongation of CA.

In Rosa D S, et al, "The effect of the Mw of PEG in PCL/CA blends" Polymer Testing (2005) 24:542-548, it was reported that blending CA with PEG(400) or PEG(1500) decreases the $T_g$ of CA and enhances its tensile strength. The authors pointed out the effect of the interactions between the free hydroxyl groups of PEG and the chains of CA as an explanation of the enhanced resistance of CA.

Water soluble biodegradable polymers may be synthesized by modifying starch and cellulose. For example, carboxymethyl cellulose (CMC) having different degrees of carboxymethyl substitution is a family of marketed water soluble polymers. Hydroxyethyl cellulose (HEC), hydroxypropyl cellulose (HPC), methyl cellulose (MC) and ethyl cellulose (EC) are used as binders, water retention aids, thickeners, film formers, lubricants, or rheology modifiers. Water soluble polysaccharides are also produced by microbial fermentation. Xanthan is the most widely used microbial polysaccharide. Pullulan has also shown various potential applications. For example, its good moisture retention and low oxygen permeability has led to its use as edible films for food packaging. To date, poly(vinyl alcohol) (PVOH) is the only polymer with exclusively carbon atoms in the main chain that is regarded as biodegradable. Importantly, PVOH is also water soluble.

Water soluble biodegradable polymers tend to be sensitive to water, which limits their use for most of the conventional polymer applications.

Embodiments of the invention provide a material that may be used in the manufacture of disposable articles and which is water-responsive. In some embodiments, such material may be versatile and inexpensive to produce. In some embodiments the material may also be stable enough for defined applications but subject to degradation under predetermined conditions.

The use of polymers for the production of water-dispersive articles is described in U.S. Pat. No. 4,826,493.

Polymer blending allows the tailoring of the properties of polymeric materials without having to invest in new chemistry. Among the different blend morphologies, co-continuous polymer blends exhibit the best performance improvements because both components can fully contribute to the properties of the blend. However, poor interface between the different polymeric phases of the blend usually leads to a significant loss of properties and, more specifically, a deterioration in mechanical performance is observed. To overcome this problem, compatibilizers may be used to strengthen the interface. In this field, the technique of reactive compatibilization is a very attractive and economical route to achieve stable, multiphase polymer blends.

For most binary polymer blends, the appropriate reactive groups are not present and functionalisation of the blend components is required. However, for some binary polymer blends, a reactive polymer can be added as compatibilizer precursor which is miscible with one of the blend components and reactive towards the other. This type of blend compatibilization can be advantageously achieved by reactive extrusion.

Reactive extrusion (REX) is a polymer processing technique that mainly involves the use of an extruder as a chemical reactor. Polymerization and other chemical reactions such as reactive compatibilization are carried out in situ, while processing is in progress. Therefore, REX differs from conventional polymer manufacturing methods, where synthesis is a separate operation and the extruder serves only as a processing aid.

Polymer blend compositions for making fibres and films that are optimally combined are desirable because they are highly stable. Optimal combination of polymers means that the polymer interface is improved in such a way that the polymer blends exhibit co-continuous morphology. This may be achieved by means of reactive extrusion. Tailored blend properties can be obtained by the judicious choice of reactive compatibilizers. Although blended polymer compositions are known, reactively compatibilized co-continuous polymer blends are desirable since the resulting composition is more stable and versatile.

The cellulose acetate compositions according to some embodiments may have desirable properties, in particular for use in disposable products such as smoking articles. The dispersion and/or degradation properties may be improved compared to those of conventional cellulose acetate compositions. In some embodiments, the compositions may be water dispersive and/or biodegradable.

Compositions may be provided with good mechanical properties, such as strength and good processability, whilst also being water dispersive and biodegradable. This means that these compositions may be used to make films and fibres which may be useful as components of disposable products such as filter tow, packaging films, nonwovens tissues, etc.

The degradation of the compositions may be improved in a combination of ways. Firstly, the compositions include a water soluble component which may render the compositions water dispersive. Upon exposure to water, the water soluble component may dissolve and, because of the homogenous nature of the blend, the water non-soluble component, namely the plasticized cellulose acetate, may then be broken up into small pieces and dispersed. This dispersal may increase the exposure of the plasticized cellulose acetate to the elements and may thereby accelerate its degradation. In addition, the plasticized cellulose acetate may biodegrade more rapidly than unplasticized cellulose acetate, further improving the rate of degradation of the composition.

In one embodiment, the cellulose acetate starting material is a CA which is not inherently degradable and/or biodegradable or is inherently only poorly or slowly degradable and/or biodegradable. Plasticized CA has been shown to exhibit an improved rate of degradation compared to that of a composition of the same CA without the plasticizer.

For example, the CA starting material may be CA having a DS of greater than 2.1. This DS means that the CA starting material is soluble in solvents such as acetone and this is generally a requirement for solvent-based processing of CA. A CA solution is formed and this may be processed in a number of ways, including solvent casting, fibre spinning or melt blending. The products manufactured using these solvent-based processes may exhibit a variety of benefits.

A blend of CA and a plasticizer is formed to provide a plasticized CA. In one embodiment, the blend is soluble in acetone or other suitable solvent and the composition formed from the solution comprises an intimate blend of CA and plasticizer. In another embodiment, the CA and plasticizer may be melt blended. Following either blending process, the plasticizer is integrated within the structure of the CA and is retained.

The CA starting material used in the present invention may be the CA used to prepare conventional cellulose acetate tow for smoking article filters. This CA generally has a DS of between 2.4 and 2.6, more commonly of around 2.5 (denoted as CA2.5).

Thus, the cellulose acetate used may have a DS of greater than 2.1, for example between 2.1 and 2.6. In one embodiment, the cellulose acetate has a DS of 2.5 to 2.6. This DS means that the CA starting material is particularly suited to the manufacture of cellulose acetate fibres by a solvent spinning process, or to the manufacture of cellulose acetate films by a solvent film casting process.

A variety of known plasticizers may be used in the present invention. There are, however, a number of properties that they preferably have. Firstly, in some embodiments, the plasticizer used may be environmentally-friendly and water soluble. Additionally or alternatively, the plasticizer may be compatible with cellulose acetate.

Where the composition is to undergo solvent processing, the plasticizer used to plasticize the cellulose acetate is preferably soluble in the solvents that may be used to form a cellulose acetate solution, such as acetone. CA is soluble in other solvents like chloroform, dimethyl sulfoxide and tetrahydrofuran, but the industrial use of these solvents could be limited. Furthermore, the CA and plasticizer may be miscible, so that the mixture of solution of CA, plasticizer and optionally solvent has a single-phase.

Where the CA and plasticizer are to be mixed by melt processing, the plasticizer will preferably have a boiling point which is higher than the melting point of the CA. This will minimise the loss of the plasticizer when the CA is heated and melted during melt processing.

Polyols are a class of compounds which have been studied as plasticizers for degradable polymers. Glycerol (also referred to as glycerine or glycerin), which is often used with degradable polymers, has been found to reduce thermal degradation of thermoplastic starch (TPS) reinforced with cellulosic fibres. However, the poor miscibility of glycerol in acetone reduces its application by solvent blending with CA and so in one embodiment, the plasticizer is not glycerol. The plasticizer may exhibit high miscibility in acetone and good solvent blending with CA.

Two families of low molecular weight plasticizers have been considered: citrate esters and simple triglycerides, together with poly(ethylene glycol) of low molecular weight. PEGs with an average molecular weight of up to 1000 daltons may be used in the present invention. These plasticizers are environmentally-friendly and water soluble, they are soluble in acetone and they form a single-phase solution with CA having a DS of greater than 2.1. In one embodiment, PEGs with an average molecular weight of greater than 1000 are not considered to be "low molecular weight" in the context of the present invention and may not be preferred for use as plasticizers.

Citrate-based plasticizers can be derived from naturally occurring citric acid. They are non-toxic and are used as plasticizers with some biodegradable polymers. Simple triglycerides such as triacetin can be used as food additives and triacetin is already applied to cigarette filters as a binder, in the manner discussed above. The high boiling point of triacetin compared to citrate-based plasticizers has the advantage of reducing the amount of plasticizer loss which occurs during melt processing.

In an embodiment, the plasticizer used to plasticize the CA is selected from the group consisting of: glycerol, triacetin (glycerol triacetate) (TA), tripropionin (glyceryl tripropionate) (TP), triethyl citrate (TEC), tributyl citrate (TBC), tributyl 2-acetyl citrate (TB2C) and low molecular weight poly(ethylene glycol) (PEG), such as PEG 200 or PEG 400.

It may be desirable to strike the right balance between hydrophilicity and plasticization efficiency (reduction in $T_g$) in order to increase the rate of degradation of CA. It has been found that degradation rate is, at least in part, a function of the hydrophilicity and plasticization efficiency and these two parameters have to be balanced in order to increase the degradation rate. The plasticizer may therefore be included in the compositions of the present invention in an amount which increases the rate of degradation of the resultant CA composition, but which also provides the composition with an acceptable $T_g$.

In one embodiment, the $T_g$ of the plasticized CA (that is, of a composition comprising a blend of CA and plasticizer) may be at least 35° C. lower compared to that of a composition comprising the same CA without plasticizer, or may be at least 65° C. lower compared to that of a composition comprising the CA without plasticizer.

The amount of plasticizer included in the plasticized cellulose acetate may be up to about 40% by weight of the combination of plasticizer and CA, or up to about 35, 30 or about 25% by weight. At least about 5%, 10%, 15% or at least about 20%, by weight of plasticizer may be included, based on the weight of the combination of plasticizer and CA. In some embodiments between about 10 and about 30% by weight, or about 10 to about 25% by weight of plasticizer is included.

Including these amounts of plasticizer does not have the effect of forming holes in a CA tow, as it has been noted in the prior art when plasticizers are sprayed onto the surface of the CA tow. It should be noted that blending CA with the plasticizers to form the plasticized CA used in the present invention is completely different to spraying the plasticizer onto the surface of CA fibres, as is done when preparing fibrous tow for constructing filter material for smoking articles in order to bind the adjacent fibres at their points of contact and to give the fibrous material structural strength and rigidity. As mentioned above, adding too much plasticizer to the surface of CA fibres can lead to the formation of holes. In the plasticized CA used in the present invention, the plasticizer is blended with CA to form a composite material (homogenous blend).

When the plasticizer is incorporated into the CA fibre in this way, as proposed in the present invention, greater amounts can be included as the formation of holes is not an issue.

In one embodiment, the composition comprising plasticized CA exhibits an increased rate of degradation compared to a composition comprising unplasticized CA. This increased rate of degradation may be quantified by an increase in the average molecular weight loss percentage over a defined period of time. The plasticized CA may exhibit an increase in the average molecular weight loss percentage of at least 50% over a period of 425 hours under accelerated weathering conditions, compared to unplasticized CA.

In an earlier study, CA with a DS of 2.5 was plasticized by blending with the environmentally-friendly plasticizers triacetin, tripropionin, triethyl citrate, tributyl citrate, tributyl 2-acetyl citrate and poly(ethylene glycol) of low molecular weight. The thermo-mechanical properties and hydrophilicity of the modified CA were measured and correlated with the content and nature of the plasticizer used and compared with these properties of unplasticized CA.

The increase in toughening and the change in the hydrophilicity by the plasticization were evaluated in terms of aging and weathering stability under accelerated conditions. Samples were exposed to UV-degradation with water spray periods. The treated samples were removed periodically and characterized by several analytical techniques. The results show the effects of plasticization on enhancement of the degradation rate of CA. The plasticization of CA triggered an increase in weight loss of between 50 and 90%, and the low molecular weight plasticizers were shown to be more effective. The results indicate that the right balance between hydrophilicity and plasticization efficiency (reduction of $T_g$) is needed in order to increase the degradation rate of CA.

The plasticized CA used in the compositions of the invention may be prepared by forming a solution comprising CA and a plasticizer. The raw material CA (for example, in the form of flakes) and the plasticizer may be dissolved in a solvent, such as acetone. The CA and plasticizer may be mixed before being added to the solvent, or they may be added to the solvent separately and/or sequentially. The result is a solution comprising CA and plasticizer. This enables the plasticizer to become integrated into the cellulose polymer structure and, upon drying the solution, for example by a film casting or solvent spinning step, the resultant composition is a resin in which the plasticizer is retained in the structure of the cellulose acetate.

In an alternative embodiment, the CA and plasticizer may be mixed by a melt blending step. The CA may be heated to a temperature above its melting point and the plasticizer is blended with the molten CA to form a homogenous blend using any suitable mixing apparatus, such as a Brabender internal mixer (model 50 EHT). Once again, this enables the plasticizer to become integrated into the cellulose polymer structure and, following processing of the blend by moulding, casting or spinning the molten composition, the resultant composition is a resin in which the plasticizer is retained in the structure of the cellulose acetate.

It should be noted it is not essential for the processing to be conducted at a temperature that is above the melting point of the CA. CA can also be processed successfully at lower temperatures, as the key is that the processing of the blend is carried out at a temperature above the melting point of the blend, which will be affected by the inclusion of the plasticizer.

Thus, the plasticized CA may be prepared by a solvent mixing approach or by melt blending and both methods result in similar compositions in terms of their rate of degradation.

The water soluble polymers used in the present invention may be biodegradable. Biodegradable water soluble polymers containing reactive groups such as hydroxyl or amine functions may be used. Preferred biodegradable water soluble polymers include polyvinyl alcohol (PVOH), carboxymethyl cellulose (CMC), hydroxyethyl cellulose (HEC), hydroxypropyl cellulose (HPC), methyl cellulose (MC) and ethyl cellulose (EC), xanthan and pullulan, or blends thereof. In one embodiment, the biodegradable water soluble polymer is PVOH or HEC. It is expected that a wide range of biodegradable water soluble polymers would be capable of imparting the same effects as PVOH and HEC and would be effective in the present invention.

Due to their poor thermal stability, xanthan and pullulan are not suitable for use as the water soluble polymer in certain embodiments because these polymers are not suitable for melt processing.

The compositions of the invention may contain from 20 to 80 wt %, or from 30 to 70 wt % of water soluble polymer, based upon the combination of the CA (such as plasticized CA) and water soluble polymer. Alternatively, the polymer blends may contain 40 to 60 wt %, or 45 to 55 wt %, or 50 wt % of water soluble polymer, based upon the combination of the CA and water soluble polymer.

In some embodiments, the water soluble polymer is plasticized, and may be plasticized before being blended with the CA, such as plasticized CA.

Suitable plasticizers for plasticizing the water soluble polymers include those mentioned above in connection with the plasticizing of the CA. Plasticization of the water soluble polymer has been found to improve the melt processability of the polymer. In particular, without plasticization, thermal degradation of the water soluble polymers can take place upon melt processing.

As far as water soluble polymers bearing hydroxyl groups are concerned, the effective plasticizers are those having the ability to form hydrogen bonds with water soluble polymers.

In an embodiment, the plasticizer used to plasticize the water soluble polymer is selected from the group consisting of: glycerol, triacetin (glycerol triacetate) (TA), tripropionin (glyceryl tripropionate) (TP), triethyl citrate (TEC), tributyl citrate (TBC), tributyl 2-acetyl citrate (TB2C), low molecular weight poly(ethylene glycol) (PEG), such as PEG 200 or PEG 400, sorbitol and pentaerythritol.

The amount of plasticizer included in the plasticized water soluble polymer may be up to about 40% by weight of the combination of plasticizer and polymer, or up to about 35, 30 or about 25% by weight. At least about 5%, 10%, 15% or at least about 20%, by weight of plasticizer may be included, based on the weight of the combination of plasticizer and the water soluble polymer. In some embodiments between about 10 and about 30% by weight, or about 10 to about 25% by weight of plasticizer is included.

In one embodiment, the plasticizer may be added to the water soluble polymer by mixing the components at an elevated temperature, for example by a melt blending process. This may be done by coextrusion of the polymer and the plasticizer. This may be done using a screw extruder, with the plasticizer being added through a liquid feeder at an appropriate point in the extrusion process. This process may, for example, be used to plasticize PVOH.

In other embodiments, for example using HEC or other cellulose derivatives as the water soluble polymer, it may be desirable to allow the polymer to swell in water prior to melt blending with the selected plasticizer. As previously mentioned, the plasticization is performed in order to allow the subsequent melt blending of the water soluble polymer with plasticized cellulose acetate.

In an alternative embodiment, the water soluble polymer is plasticized by first forming a mixture of the water soluble polymer and plasticizer at room temperature and leaving this mixture to swell over a period of several hours. The resultant premix may then be melt-processed at elevated temperature to form a plasticized composition. The addition of water to the mixture of polymer and plasticizer may improve the swelling of the premix blend, thereby facilitating diffusion of the plasticizer throughout the mixture.

The formation of a blend of CA and a water soluble polymer according to the present invention may involve the production of a homogenous blend of the polymeric components. Co-continuous polymer blends exhibit the best performance improvements because both components can fully contribute to the properties of the blend. In an embodiment, the water soluble polymer should at least exhibit a co-continuous morphology in order to ensure the water dispersiveness of the final composition. All compositions for which CA is the minor component—i.e. CA exhibiting a phase-dispersed morphology—will be water dispersive. Co-continuous blends represent the best compromise between mechanical performance, processability and water responsiveness.

In some embodiments, the ratio of CA to water soluble polymer is between 20:80 and 80:20. In some embodiments, 30 wt % CA is blended with 70 wt % of water soluble polymer, 50 wt % CA is blended with 50 wt % of water soluble polymer, or 60 wt % CA is blended with 40 wt % of water soluble polymer. In embodiments where plasticized CA and/or plasticized water soluble polymer is used, the ratios mentioned above refer to the amounts of the plasticized polymer(s).

Melt blending is a method that may be used to combine the CA, such as plasticized CA, and water soluble polymer. More particularly, reactive melt processing through reactive extrusion may be effective.

The melt blending of the CA, such as plasticized CA, and water soluble polymer may be subjected to thermo-mechanical deformation in a suitable kneader, such as a Brabender®-type internal mixer, a roll mill, a single or multiple screw extruder, or any other mechanical mixing device which can be used to mix, compound, process or fabricate polymers. A particularly desirable reaction device is an extruder having one or more ports. In a preferred embodiment, the reaction device is a co-rotating, twin-screw extruder, such as a ZSE 18 HP twin-screw extruder manufactured by Leistritz GmbH, Nuremberg (Germany). This extruder allows multiple feeding and venting ports.

Thus, according to some of the methods provided, the blend of CA and water soluble polymer is prepared by a process including the plasticization of the water soluble polymer by melt processing, and the subsequent melt blending of plasticized cellulose acetate with the plasticized water soluble polymer. For most of the water soluble polymers, there is no common solvent with cellulose acetate. Therefore, solvent-based processing may not be a convenient preparative method.

Some blends of CA, such as plasticized CA, and water soluble polymer exhibit a poor interface between the different polymeric phases and this will frequently lead to a significant loss of the desired properties and deterioration in mechanical performance of the blend is often observed. Therefore, where the CA, such as plasticized CA, and water soluble polymer do not readily mix to form a single phase, homogenous blend, further components may be added to the blend to reduce or prevent phase separation.

The polymer blends of the present invention may be compatibilized. This provides the blend with excellent processability.

Compatibilization refers to a process of modification of the interfacial properties of an immiscible polymer blend. Compatibilization allows for the production of immiscible polymer blends having a modified interface and/or morphology, wherein the two immiscible polymers are stabilized either by covalent or ionic bond formation between phases, or by attractive intermolecular interaction (e.g., dipole-dipole, ion-dipole, charge-transfer, H-bonding or van der Waals forces, etc.). Reactive compatibilization of immiscible polymer blends is a method used to obtain well dispersed and stabilized phase morphologies. It is based on the in situ formation of block- or graft copolymer at the interface between the phases of the polymer blend during melt blending. In some cases, a third polymer, which is miscible with one of the blend components and reactive with the other, can be used for the formation of a compatibilizing copolymer at the interface. In the present invention, the reactive compatibilization of immiscible polymer blends may be ensured by the fact that main blend components are covalently bonded.

Compatibilization of the CA, such as plasticized CA, and water soluble polymer is ensured by the use of a compatibilizer which is miscible with one of the polymers and which is reactive towards groups presented by the other polymer. The compatibilizer may allow covalent or ionic bonds to be formed between the main blend components.

In one embodiment, the compatibilizer is a grafted copolymer. Many biodegradable water soluble polymers present hydroxyl groups. Thus, a selected reactive group may be grafted to a polymer which presents affinity for CA (such as polylactic acid or polylactide (PLA)), to render the grafted copolymer able to interact with CA and to be reactive towards the hydroxyl functions of the water soluble polymer.

The grafted copolymer compatibilizer may be biodegradable and exhibit good processing properties. PLA is therefore a possible constituent of the compatibilizer. CA-based grafted copolymers may also be used. In this case, the grafted copolymer is miscible with CA and reactive towards the hydroxyl functions of the water soluble polymer.

Maleic anhydride is reactive towards the hydroxyl functions of water soluble polymers and may therefore be used to form the grafted copolymer compatibilizer.

A preferred reactive compatibilizer is maleic anhydride-grafted polylactide (MA-g-PLA). This is reactive towards the hydroxyl groups of the selected water soluble polymer (for instance, HEC or PVOH), as well as being able to interact with CA, leading to an improvement in the quality of the interface between CA and the selected water soluble polymer. Maleic anhydride-grafted CA is also an effective compatibilizer. In this case, the reactive compatibilization of the polymer blends is achieved in such a way that the main blend components are covalently bonded through the reactive compatibilizer. Any amphiphilic grafted copolymer exhibiting affinity for both CA and a selected water soluble polymer is a suitable alternative as a compatibilizer, especially CA-based amphiphilic copolymers.

A method for making one possible reactive compatibilizer, namely maleic anhydride-grafted polylactide (MA-g-PLA), uses a reactive-extrusion process. The grafting reaction can also be performed in other reaction devices, provided that the necessary mixing of PLA, maleic anhydride (MA) and any other reactive ingredients is achieved and enough energy is provided to effect the grafting reactions. The grafted PLA may contain from about 0.1 to about 5 mol % of grafted MA. In some embodiments, the grafted PLA contains about 0.2 to about 1 mol % of grafted MA, or from about 0.3 to about 0.6 mol % of grafted MA.

Other reactive ingredients which may be added to the compositions of this invention include initiators such as Lupersol® 101, a liquid, organic peroxide available from Elf Atochem North America, Inc. of Philadelphia, USA. Free radical initiators useful in the practice of this invention include acyl peroxides such as benzoyl peroxide; dialkyl; diaryl; or aralkyl peroxides such as di-t-butyl peroxide; dicumyl peroxide; cumyl butyl peroxide; 1,1 di-t-butyl peroxy-3,5,5-trimethylcyclohexane; 2,5-dimethyl-2,5-di(t-butylperoxy)hexane; 2,5-dimethyl-2,5-bis(t-butylperoxy)hexyne-3 and bis(a-t-butyl peroxyisopropylbenzene); peroxyesters such as t-butyl peroxypivalate; t-butyl peroctoate; t-butyl perbenzoate; 2,5-dimethylhexyl-2,5-di(perbenzoate) t-butyl di(perphthalate); dialkyl peroxymonocarbonates and peroxydicarbonates; hydroperoxides such as t-butyl hydroperoxide, p-methane hydroperoxide, pinane hydroperoxide and cumene hydroperoxide and ketone peroxides such cyclohexanone peroxide and methyl ethyl ketone peroxide. Azo compounds such as azobisisobutyronitrile may also be used.

Furthermore, other components known in the art may be added to further enhance the properties of the final material. For example, polyethylene glycol may be further added to improve melt viscosity. Other additives may also be incorporated to provide specific properties, as desired. For example, anti-static agents, organo-modified clays, pigments, colorants and the like may be incorporated into the polymer composition.

Additionally, processing characteristics may be improved by incorporating lubricants or slip agents into the polymer blends of the invention. All of these additives are generally used in relatively small amounts, usually less than 3% by weight of the final composition.

The presence of CA, such as plasticized CA, in blends used to make films and fibres reduces the water sensitivity of the neat water soluble polymers. Inclusion of a compatibilizer such as MA-g-PLA may provide enhanced compatibility between CA and water soluble polymers by means of a reactive compatibilization process performed by reactive extrusion. Such compatibilization aims at improving both processability and thermo-mechanical properties of the final material. It is possible to use the blends to make other shapes than films or fibres and to thermally form the blends into complex shapes.

In one embodiment, the compositions of the present invention may be provided in the form of fibres. The fibres may be formed by a spinning process or by extrusion. For the production of fibres, melt spinning or electro spinning from molten compositions could be practiced. These methods advantageously ensure that no solvent can be carried over into the final product. For the melt spinning process, the polymer is melted and pumped through a spinneret (die) with one or more holes (for example, ranging from one to thousands). The molten fibres are cooled, solidified, and collected on a take-up wheel. Stretching of the fibres in both the molten and solid states provides fibres with controlled diameters. Electrospinning allows for producing nanofibres starting from a molten polymer. The molten polymer is injected at a constant feed rate though a nozzle or needle which is charged to a high voltage, typically 10 to 30 kV. The applied voltage induces a charge on the surface of the liquid droplet and when this is sufficiently high, the hemispherical surface of the fluid elongates and a cone is established. On increasing the applied voltage further, a charged liquid jet is ejected from the cone and attracted to the earthed collector, which is positioned at a fixed distance from the needle.

One particular application for the compositions of the present invention is in smoking articles which are stored in relatively stable conditions and are then quickly used and discarded. It is desirable for the remaining elements of the spent smoking article, in particular the filter element, to dissociate and disperse quickly under normal environmental conditions, and for the constituent parts to biodegrade.

The fibres comprising the compositions of the present invention may be used to form a CA tow suitable for use in the filter element of a smoking article. Once the fibres have been prepared, they may be processed in the conventional way to form a tow. The CA tow may or may not be treated with further plasticizer to bind adjacent fibres to one another to ensure that the filter element has the required hardness and structural stability. The fibres of the tow may have the same dimensions as those used in the tow of conventional smoking article filters. In this context, the fibre used in the filter production is generally characterised as having a particular denier per filament (DPF). The tow denier is also used to describe the filter fibres. In the case of conventional CA filters, the lowest DFP is 1.5 and the highest is approximately 8 or 9. In terms of diameter, conventional filter fibres tend to fall within the range of 20 to 100 μm. In one embodiment, the fibres of the present invention have a DFP of between 1 and 10, or between 1.5 and 9. The diameter of the fibres may be from 10 to 150 μm, or from 20 to 100 μm.

In one embodiment, a CA tow may be made from the CA compositions of the present invention, and the tow may be treated with a plasticizer such as triacetin, in order to bind adjacent fibres of the tow and to achieve the hardness needed for use in the filter element of a smoking article.

A filter element comprising the CA compositions according to the present invention may be incorporated into a smoking article in the conventional manner and using conventional processes and apparatus. Some of these filter elements may have the benefit that they will degrade at a much faster rate compared to a conventional filter element once the smoking article has been used.

Referring to FIG. 1, a smoking article 1 according to an embodiment of the invention comprises a filter 2 and a cylindrical rod of smokeable material 3, such as tobacco, aligned with the filter 2 such that one end of the smokeable material rod 3 abuts the end of the filter 2. The filter 2 is wrapped in a plug wrap (not shown) and the smokeable material rod 3 is joined to the filter 2 by tipping paper in a conventional manner. The filter 2 is substantially cylindrical and has a mouth end 4 and a smokeable material end 5. The filter 2 comprises a plug of filter material comprising cellulose acetate fibres 6. The fibres 6 have a composition comprising a blend of cellulose acetate and a water soluble polymer as described herein.

Although the illustrated smoking article 1 includes a filter 2 having a single filter element or segment comprising a blend of cellulose acetate and a water soluble polymer as described herein, other arrangements are possible. For instance, the filter 2 can comprise multiple segments, such as 2, 3 or more segments, with some or all of the segments comprising fibres 6 having a composition of cellulose acetate and a water soluble polymer as described herein. Also, although a filter 2 having fibres 6 having a composition of cellulose acetate and a water soluble polymer have been described, other components of the smoking article 1 can include such a composition, for instance the plug wrap or the tipping paper and/or the composition can be used in the filter 2 or other parts of the smoking article 1 in a form other than fibres, for instance granules.

The following examples are provided to assist in the understanding of the invention and are not intended to limit the scope of the invention.

EXAMPLE 1

Cellulose acetate, CA2.5, ($M_n$=65.400 and polydispersity index of 3.4) with a degree of substitution of 2.5. PVOH (grade Mowiol® 23-88) was provided by Kuraray GmbH, Germany. Triacetin (TA) and glycerol was purchased from Acros. Before processing, polymers and additives were dried overnight at 80° C. in ventilated oven.

Plasticization of CA2.5 using triacetin (30 wt %) and of PVOH using glycerol (25 wt %) was carried out using a Leistritz ZSE 18 HP twin screw extruder. The plasticizers were introduced through the second barrel zone under the control of a liquid feeder. The extruder temperature profiles utilized for plasticization are summarised in Table 1. For both polymers, processing parameters were optimized in order to increase the extruder throughput and to obtain extruded products with low colour. Indeed, clear and transparent pellets with very low yellow colour have been produced at 4-5 kg/h using a screw speed of 250 rpm.

TABLE 1

Extruder temperatures for CA and PVOH plasticization

| | Extruder temperatures (° C.) | | | | | | | | |
|---|---|---|---|---|---|---|---|---|---|
| | Barrel zones | | | | | | | | |
| Polymer | 1 | 2 | 3 | 4 | 5 | 6 | 7 | die | melt |
| CA | 200 | 220 | 230 | 230 | 220 | 210 | 200 | 190 | 173 |
| PVOH | 170 | 190 | 210 | 210 | 210 | 210 | 200 | 200 | 168 |

EXAMPLE 2

Hydroxyethyl cellulose (HEC) was plasticized in a different manner. Instead of the direct plasticization in the extruder (as used in Example 1), a method commonly used for the plasticization of starch was successfully adapted.

Mixtures of HEC and plasticizers were prepared at room temperature and water was added to some mixtures. So-obtained premixes were left to swell overnight. Next, the mixtures were melt-processed using a Brabender bench-scale kneader (model 50 EHT, 80 cm³ free volume) at 110° C. for 6 minutes.

Various compositions were prepared in order to investigate the effect of both water and plasticizer content and the results are shown in Table 2. It was observed that the addition of water improved the swelling of the premix blend, facilitating plasticizer diffusion. In these trials, triacetin was tested without success. Poly(ethylene glycol) 200 and 400 purchased from Fluka were also used as the HEC plasticizer. For each composition, a gel-like structure was obtained after melt mixing, which indicates an effective HEC plasticization.

TABLE 2

Premix blend compositions HEC/water/plasticizer

| | Premix blend (wt %) | | | | |
|---|---|---|---|---|---|
| | | | Plasticizer | | |
| Entry | HEC | Water | Glycerol | PEG200 | PEG400 |
| 1 | 60 | — | 40 | — | — |
| 2 | 70 | — | 30 | — | — |
| 3 | 60 | 10 | 30 | — | — |
| 4 | 60 | 15 | 25 | — | — |
| 5 | 70 | 10 | 20 | — | — |
| 6 | 60 | 10 | — | 30 | — |
| 7 | 60 | 10 | — | — | 30 |

EXAMPLE 3

Maleic anhydride-grafted PLA was produced using a Leistritz ZSE 18 HP. The selected poly(lactic acid) (PLA, 4032D) was a commercial grade supplied by NatureWorks LLC (USA), with a number average molecular weight (Mn(PLA)) of 58,000 g/mol, D-isomer content of approximately 1.5% and polydispersity index of 2.1. Any PLA grade may be selected, with the molecular weight of the PLA being chosen to provide the desired properties.

Prior to the introduction into the extruder, dried PLLA pellets were premixed with 3 wt % of maleic anhydride (purchased from Sigma-Aldrich) and 0.5 wt % of Lupersol® 101. Maleation was then conducted at 190° C. using a low screw speed (so rpm) in order to increase the residence time. So-obtained PLLA-g-MA was purified and the MA amount assessed by titration. The MA content was estimated to be 0.45 wt %.

EXAMPLE 4

Various plasticized CA/PVOH polymer blend compositions were produced using CA plasticized with 30 wt % triacetin (pCA) and PVOH plasticized with 25 wt % glycerol (pPVOH). The plasticized polymers were prepared as set out in Example 1. Blend formulations were conceived in terms of polymer ratios without considering the plasticizer content: the CA/PVOH (50/50) blend was produced by mixing 51.7 parts of pCA with 48.3 parts of pPVOH, leading to a total plasticizer content in the blend of 28 wt %.

In some formulations, maleic anhydride-grafted PLLA (PLLA-g-MA) was included. This reactive compatibilizer was prepared as set out in Example 3.

Melt-compounding of the polymers was conducted at 190° C. using a Brabender bench-scale kneader (model 50 EHT, 80 cm³ free volume) equipped with cam blades for 3 minutes at 30 rpm, followed by 6 minutes at 60 rpm.

500 μm thick films were then prepared by compression moulding at 190° C. using an Agila PE20 hydraulic press (low pressure for 120 seconds without degassing cycle, followed by a high-pressure cycle at 150 bar for 180 seconds and cooling by tap water at 50 bar for 180 seconds).

The composition and the mechanical properties of film samples of the prepared plasticized CA/PVOH blends are reported in Table 3. As the plasticizer relative content varies within a reliably narrow range between 25 and 28 wt %, its effect on the mechanical properties can be discounted.

TABLE 3

Composition and tensile parameters of CA/PVOH blends

| Entry | Polymer ratio (wt %) CA | Polymer ratio (wt %) PVOH | PLLA-g-MA[a] | Plast.[b] (wt %) | WSF[c] | Young modulus (MPa) | Stress at break (MPa) | Strain at break (%) |
|---|---|---|---|---|---|---|---|---|
| 1 | 30 | 70 | 0 | 27 | 0.69 | 70 ± 16 | 22.1 ± 1.5 | 434 ± 70 |
| 2 | 30 | 70 | 10 | 25 | 0.62 | 334 ± 21 | 11.9 ± 0.3 | 32 ± 5 |
| 3 | 30 | 70 | 10[d] | 25 | 0.62 | 28 ± 4 | 20.2 ± 0.1 | 494 ± 18 |
| 4 | 50 | 50 | 0 | 28 | 0.48 | 314 ± 15 | 11.8 ± 1.1 | 70 ± 11 |
| 5 | 50 | 50 | 10 | 25 | 0.44 | 371 ± 3 | 10.0 ± 0.6 | 19 ± 5 |
| 6 | 60 | 40 | 0 | 28 | 0.38 | 392 ± 15 | 13.7 ± 0.5 | 61 ± 3 |
| 7 | 60 | 40 | 10 | 25 | 0.35 | 464 ± 27 | 13.6 ± 0.4 | 30 ± 3 |
| 8 | 100 | 0 | 0 | 30 | 0 | 1387 ± 21 | 36.6 ± 0.1 | 56 ± 6 |

[a]Added to polymer blend (phr).
[b]Plasticizer content in the blend.
[c]Water soluble fraction in weight.
[d]Unmodified PLLA was used.

Increased blend compatibility will improve the capability to produce fibres from these blends from melt. Indeed, two blends were prepared using 10 phr of PLLA-g-MA or PLLA (entries 2 and 3 on Table 2) and their mechanical properties determinate. The toughness increase observed for the blend using PLLA-g-MA put in manifest the reactive compatibilization, by formation of covalent bonds, of this blend. As a general trend, blend toughness increased with PLLA-g-MA incorporation. However, the ultimate elongation is reduced after adding 10 phr (parts per hundred parts of resin) of PLLA-g-MA.

EXAMPLE 5

Various compositions of plasticized CA/HEC blends were produced using plasticized CA (pCA) with 30 wt % TA and plasticized HEC (pHEC) with 25 wt % glycerol, prepared as set out in Examples 1 and 2, respectively. The blend formulations were prepared in the same way as the CA/PVOH blends described in Example 4. Maleic anhydride-grafted PLLA (PLLA-g-MA), prepared as described in Example 3, was added and tested as a reactive compatibilizer.

The composition and the mechanical properties of films prepared from CA/HEC plasticized blends are set out in Table 4. As the relative plasticizer content varies within a reliably narrow range its effect on the mechanical properties can be discounted.

The results indicate that the CA/HEC blends exhibit comparable properties to those of the CA/PVOH plasticized blends of Example 4.

EXAMPLE 6

Blends prepared following the procedure described in Examples 4 and 5 were extruded into fibres. For that purpose, DSM vertical mini-extruder was used equipped with dedicated fibre die and an Xplore high speed winding unit.

In accordance with normal procedure, different extrusion parameter configurations (temperature profile, screw speed and die) were assayed in order to produce a consistent monofilament capable of being attached to the winding unit. Then, depending on the diameter of the die and the draw-ratio, a certain filament thickness could be obtained.

Attempts to produce monofilaments using both compatibilizer-free CA/PVOH blends and MAgPLLA-based compositions were carried out. The better processability was observed for monofilaments based on compatibilized blends. This observation confirmed the ability of MAgPLLA to improve the compatibility of CA/PVOH compositions.

EXAMPLE 7

Monofilaments based on CA/PVOH blends were produced. For this purpose, DSM vertical mini-extruder equipped with a dedicated monofilament die was used to produce the samples (0.4 mm diameter monofilaments). The

TABLE 4

Composition and tensile parameters of compatibilized and uncompatibilized CA/HEC plasticized blends.

| Entry | Polymer ratio (wt %) CA | Polymer ratio (wt %) HEC | PLA-g-MA[a] | Plast.[b] (wt %) | WSF[c] | Young modulus (MPa) | Stress at break (MPa) | Strain at break (%) |
|---|---|---|---|---|---|---|---|---|
| 1 | 30 | 70 | 0 | 27 | 0.69 | 72 ± 8 | 6.9 ± 0.4 | 42 ± 3 |
| 2 | 30 | 70 | 10 | 25 | 0.62 | 157 ± 19 | 4.9 ± 0.6 | 17 ± 5 |
| 3 | 50 | 50 | 0 | 28 | 0.48 | 278 ± 12 | 10.6 ± 0.4 | 30 ± 3 |
| 4 | 50 | 50 | 10 | 25 | 0.44 | 370 ± 10 | 10.8 ± 0.6 | 19 ± 4 |

[a]Added to polymer blend (phr).
[b]Plasticizer content in the blend.
[c]Water soluble fraction in weight.

compositions were prepared at 210° C. using a screw speed of 120 rpm and mixing time of 4 min. Compositions characterized by the following weight fractions were considered:

CA/PVOH 50/50 (w/w)
CA/PVOH 40/60 (w/w)
CA/PVOH 40/60 (w/w)+5 wt % MAgPLLA
CA/PVOH 30/70

Table 5 reports the tensile properties of the prepared monofilaments. Testing conditions used are similar to those considered for film testing (crosshead speed: 20 mm·min$^{-1}$, gauge length: 25.4 mm).

As observed, the addition of PVOH to CA reduced the Young modulus but allowed improving the strain at break. If CA/PVOH 40/60 (w/w) is considered, the addition of MAgPLLA further enhanced this ultimate elongation. It is also worth noting that this composition is characterized by the highest tensile strength.

TABLE 5

Tensile properties of monofilaments of CA/PVOH blends

| Entry | Polymer (wt %) CA$^a$ | PVOH$^b$ | Compatibilizer | Young modulus (MPa) | Stress at break (MPa) | Strain at break (%) |
|---|---|---|---|---|---|---|
| 1 | 100 | 0 | None | 2391 ± 764 | 50.1 ± 8.9 | 2 ± 1 |
| 2 | 50 | 50 | None | 1063 ± 187 | 39.1 ± 9.1 | 40 ± 9 |
| 3 | 40 | 60 | None | 2180 ± 400 | 71.6 ± 8.6 | 12 ± 2 |
| 4 | 40 | 60 | MAgPLLA$^c$ | 1343 ± 291 | 72.9 ± 14 | 21 ± 8 |
| 5 | 30 | 70 | None | 593 ± 212 | 34.1 ± 4.5 | 15 ± 4 |

$^a$ plasticized with 20 wt % triacetin
$^b$ plasticized with 30 wt % glycerol
$^c$ 5 wt %

For the avoidance of doubt, it is confirmed that any feature of the invention may be used in combination with any other feature. In particular, any feature in a claim may be used in combination with any other feature in a claim.

In order to address various issues and advance the art, the entirety of this disclosure shows by way of illustration various embodiments in which the claimed invention(s) may be practiced and provide for superior compositions and filters. The advantages and features of the disclosure are of a representative sample of embodiments only, and are not exhaustive and/or exclusive. They are presented only to assist in understanding and teach the claimed features. It is to be understood that advantages, embodiments, examples, functions, features, structures, and/or other aspects of the disclosure are not to be considered limitations on the disclosure as defined by the claims or limitations on equivalents to the claims, and that other embodiments may be utilised and modifications may be made without departing from the scope and/or spirit of the disclosure. Various embodiments may suitably comprise, consist of, or consist essentially of, various combinations of the disclosed elements, components, features, parts, steps, means, etc. In addition, the disclosure includes other inventions not presently claimed, but which may be claimed in future.

The invention claimed is:

1. A composition comprising a blend of cellulose acetate and a water soluble polymer, wherein the blend is compatibilized by inclusion of a reactive compatibilizer which can interact with the cellulose acetate and form covalent bonds with the water soluble polymer; wherein the compatibilizer is a grafted co-polymer; and wherein the ratio of cellulose acetate to water soluble polymer is between 20:80 and 80:20.

2. The composition as claimed in claim 1, wherein the compatibilizer comprises one of maleic anhydride-grafted polylactide and maleic-anhydride-grafted cellulose acetate.

3. The composition as claimed in claim 1, wherein the cellulose acetate is plasticized cellulose acetate comprising a blend of cellulose acetate and a plasticizer.

4. The composition as claimed in claim 3, wherein the plasticized cellulose acetate has a plasticizer content of up to 40% by weight.

5. The composition as claimed in claim 3, wherein the plasticized cellulose acetate is plasticized using a plasticizer selected from the group consisting of: glycerol, triacetin (glycerol triacetate) (TA), tripropionin (glyceryl tripropionate) (TP), triethyl citrate (TEC), tributyl citrate (TBC), tributyl 2-acetyl citrate (TB2C) and low molecular weight poly(ethylene glycol) (PEG).

6. The composition as claimed in claim 3, wherein the plasticized cellulose acetate has a plasticizer content of between 10 and 25% by weight.

7. The composition as claimed in claim 1, wherein the cellulose acetate has a degree of substitution of from 2.1 to 2.8.

8. The composition as claimed in claim 1, wherein the water soluble polymer is selected from the group consisting of: polyvinyl alcohol (PVOH), carboxymethyl cellulose (CMC), hydroxyethyl cellulose (HEC), hydroxypropyl cellulose (HPC), methyl cellulose (MC) and ethyl cellulose (EC), xanthan and pullulan, and blends thereof.

9. The composition as claimed in claim 1, wherein the water soluble polymer is plasticized.

10. The composition as claimed in claim 9, wherein the plasticized water soluble polymer has a plasticizer content of up to 40% by weight.

11. The composition as claimed in claim 9, wherein the plasticized water soluble polymer is plasticized using a plasticizer selected from the group consisting of: glycerol, triacetin (glycerol triacetate) (TA), tripropionin (glyceryl tripropionate) (TP), triethyl citrate (TEC), tributyl citrate (TBC), tributyl 2-acetyl citrate (TB2C), low molecular weight poly(ethylene glycol) (PEG), sorbitol, and pentaerythritol.

12. The composition as claimed in claim 9, wherein the plasticized water soluble polymer has a plasticizer content of between 10 and 30% by weight.

13. The composition as claimed in claim 1, wherein the cellulose acetate has a degree of substitution of from 2.3 to 2.7.

14. The composition as claimed in claim 1, wherein the cellulose acetate has a degree of substitution of from 2.4 to 2.6.

15. The composition as claimed in claim 1, wherein the cellulose acetate has a degree of substitution of about 2.5.

16. A method, comprising: preparing a composition including a blend of cellulose acetate and a water soluble polymer, wherein the blend is compatibilized by inclusion of a reactive compatibilizer, wherein the compatibilizer is a grafted co-polymer, wherein the ratio of cellulose acetate to water soluble polymer is between 20:80 and 80:20, and wherein the cellulose acetate, water soluble polymer and compatibilizer are combined by melt blending.

17. The method as claimed in claim 16, wherein the cellulose acetate, water soluble polymer and compatibilizer are combined by reactive melt processing through reactive extrusion.

18. A fibre or fibrous material comprising: a composition comprising a blend of cellulose acetate and a water soluble polymer, wherein the blend is compatibilized by inclusion of a reactive compatibilizer which can interact with the cellulose acetate and form covalent bonds with the water soluble polymer; wherein the compatibilizer is a grafted co-polymer; and wherein the ratio of cellulose acetate to water soluble polymer is between 20:80 and 80:20.

19. A filter element for a smoking article comprising the fibre or fibrous material as claimed in claim 18.

20. A smoking article comprising the filter element as claimed in claim 19.

* * * * *